Aug. 13, 1968  G. P. TAYLOR  3,396,471

TAPE COMBINATION MEASURE

Filed Jan. 13, 1966

INVENTOR.
GERALD P. TAYLOR 3,396,471
TAPE COMBINATION MEASURE
Gerald P. Taylor, R.R. 1, Gilbert, S.C. 29054
Filed Jan. 13, 1966, Ser. No. 520,436
1 Claim. (Cl. 33—127)

ABSTRACT OF THE DISCLOSURE

A tape dispenser including a supporting frame for a rotatable drum carrying tape wound around the same, and a rotatable measuring device which is engageable to rotate with the drum during tape dispensing operation, the measuring device including a circular disc with measurement graduations around the periphery thereof for alignment with an indicator arrow marked upon the supporting frame.

---

This invention relates generally to tape dispensers more specifically it relates to tape dispensing devices having self contained means for indicating length of tapes dispensed therefrom.

A principal object of the present invention is to provide a tape dispenser having self contained means for measuring out a quantity of tape to be dispensed therefrom and wherein the measuring device may be readily reset for measuring out each subsequent strip of tape taken therefrom.

Another object of the present invention is to provide a tape dispenser having a self contained measuring device which will register the measurement of a length of tape whose length is wound about a plurality turns upon the dispenser drum.

Another object of the present invention is to provide a tape dispenser wherein the measuring device may be rotationally reset without the necessity of rotating the drum carrying the tape.

A still further object of the present invention is to provide a tape dispenser, wherein the measuring device may be visibly seen upon both sides of the dispenser.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

These and other objects will be readily evident upon a study of the following specification and the accompanying drawing, wherein.

Figure 1:
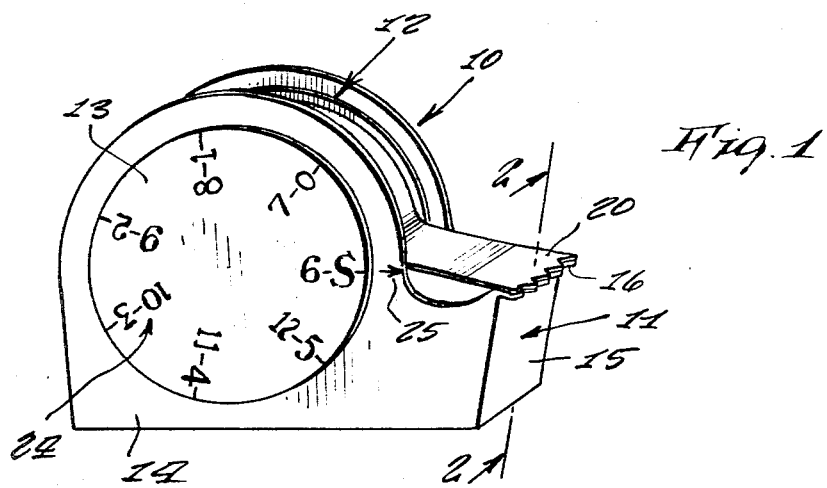
FIGURE 1 is a perspective view of a tape dispenser incorporating the present invention.

Referring now to the drawing in detail, numeral 10 represents a tape combination measurer according to the present invention, wherein there is a frame 11, a drum 12 and a measuring device 13.

The frame 11 comprises a stationary support upon which the drum 12 and measuring device 13 are supported rotatably free. The frame 11 may be made from sheet metal, plastic or other convenient material and includes a pair of upstanding side walls 14 parallel to each other and at least one end wall 15 at the front end having a serrated cutting edge 16 along the upper edge thereof. Each side wall has an opening 17 therein. The openings being in alignment axially with each other.

The drum 12 comprises a cylindrical member made preferably from rigid plastic or other material as desired and includes a pair of side flanges in spaced apart parallel relation to each other between which there is a peripheral depression 19 within which a length of tape 20 is wound upon the drum. The drum has a central opening 21 of circular configuration for the purpose of receiving therethrough a means upon which the drum is rotatably supported.

The measuring device 13 comprises a pair of parallel flat spaced apart circular discs 22 connected integrally together by means of a cylindrical sprocket 23. It shall be noted that the measuring device, discs and sprocket may be made from molded plastic material of rigid type or other material as desired. The discs 22 are located upon the outer side of the frame 11 to permit visual access to the outer side of each disc where a plurality of linear insignia 24 is imprinted for indicating the length of tape being dispensed from the device as shown in FIGURE 1 of the drawing, the printed legend upon each disc includes a plurality of numerals 25 arranged in numerical order. A singular alphabetical letter S is also imprinted upon the dials or discs 22. Upon each side wall 14 of the frame 11 there is an arrow indicator 25 imprinted, which is used in alignment with the numerals 24 selectively.

Figure 2:
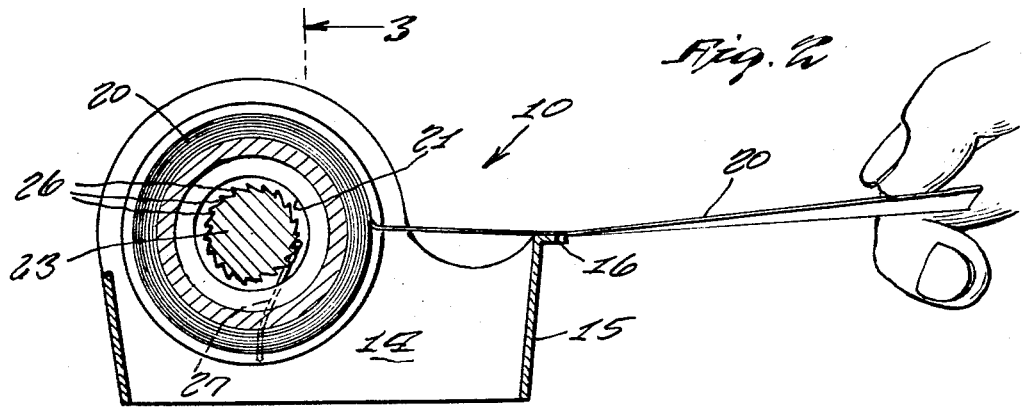
FIGURE 2 is a cross-sectional view taken on the line 2—2 of FIGURE 1.
Figure 3:
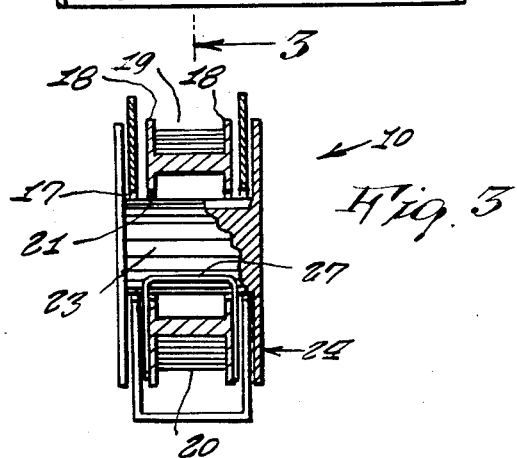
FIGURE 3 is a cross-sectional view taken on the line 3—3 of FIGURE 2.

The sprocket 23 has a plurality of teeth 26 which are in engagement with a U-shaped wire pawl 27 secured upon opposite sides of the outer side of each flange 18 of the drum 12 as is shown in FIGURE 2 of the drawing. The teeth 26 are of a configuration whereby the pawl 27 will travel freely in one direction across the teeth, however, will remain in engagement therewith when moved in the opposite direction.

In operative use, the measuring device is rotated to a start position as is indicated in FIGURE 1 of the drawing, wherein the letter S is opposite the indicator arrow 25 this point being one inch from the serrated cutting edge 16. The tape 20 is then pulled out the desired length, this length being indicated by the numerical designations as they pass the indicator arrow 25. When the correct length of tape desired is indicated by the proper numeral being opposite the indicator arrow 25 the tape may then be torn over the serrated cutting edge in a conventional manner as is shown in FIGURE 2. After the tape has been torn off and it is desired to reset the machine for a subsequent measured tape dispensing, the measuring device is rotated until the alphabetical designation S is opposite the indicator arrow 25. It will be noted that the measuring device may be rotated alone without rotating the drum, this being accomplished by the pawl 27 traveling across the teeth 26 in a direction whereby the pawl slips over the teeth without engagement therewith. During the tape dispensing operation the drum is rotated in a direction whereby the pawl 27 becomes lodged behind one of the teeth 26 and carries the sprocket therewith, thus causing the measuring device to also rotate together with the drum.

Thus, a simple measuring device has been combined with a tape dispenser.

While various changes may be made in the detail construction, it shall be understood that such changes shall be within the spirit and scope of the present invention as defined by the appended claim.

What I now claim is:

1. In a tape combination measurer, the combination of a frame, a measuring device, and a drum, said measuring device and said drum being carried rotatably upon said frame, means for selectively engaging said drum and said measuring device for rotating together in one direction, said drum and measuring device being free of each other when rotated in an opposite direction, said frame comprising a pair of parallel, spaced apart, upstanding side walls and at least one end wall, said end wall being connected to said side walls, said end wall having a serrated cutting upper edge, said side walls of said frame each having a central opening, said central openings being in axial alignment with each other, each of said side walls having an indicator arrow imprinted thereupon which is a prescribed distance away from said serrated cutting edge, said measuring device comprising a cylindrical member having a pair of flat, parallel, spaced apart, circular discs integrally connected together by means of a sprocket therebetween, said sprocket being in axial alignment with both said discs, said sprocket having ratchet teeth, each one of said discs having a plurality of numerical designations imprinted upon an outer side thereof, said numerical designations defining the periphery of each of said discs into linear chords, said chords corresponding approximately equally to the length of a tape wound upon said drum, said drum comprising a cylindrical member having a pair of flat, parallel, spaced apart, radially outwardly extending flanges, a peripheral depression between said flanges defining a channel into which a length of tape is wound around said drum, said drum having a central opening extending transversely therethrough for being supported around said sprocket and permit rotation of said drum therearound, and said drum having a U-shaped pawl secured thereto, said pawl comprising a pair of parallel, spaced apart legs and a transverse portion between said legs, said legs being secured each upon one outer side of each of said flanges, and said transverse portion extending through said central opening of said drum, said transverse portion of said pawl engaging said ratchet teeth of said sprocket.

References Cited
UNITED STATES PATENTS

| | | | |
|---|---|---|---|
| 491,488 | 2/1893 | Lundy | 225—18 |
| 1,062,543 | 5/1913 | Koniakowsky | 33—127 |
| 2,617,198 | 11/1952 | Sharpe | 225—17 X |

FOREIGN PATENTS

| | | |
|---|---|---|
| 953,141 | 11/1956 | Germany. |
| 161,445 | 4/1921 | Great Britain. |

HARRY N. HAROIAN, *Primary Examiner.*